United States Patent
Konno et al.

(10) Patent No.: US 7,913,258 B2
(45) Date of Patent: Mar. 22, 2011

(54) INFORMATION PROCESSING DEVICE AND PROCESS CONTROL METHOD

(75) Inventors: Masahiro Konno, Fuchu (JP);
Yukinobu Mizoguchi, Odawara (JP);
Takashi Maruyama, Minamiasigara (JP); Tomohisa Kohiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1352 days.

(21) Appl. No.: 11/365,608

(22) Filed: Mar. 2, 2006

(65) Prior Publication Data
US 2007/0168747 A1 Jul. 19, 2007

(30) Foreign Application Priority Data

Nov. 9, 2005 (JP) .................. 2005-324863

(51) Int. Cl.
*G06F 9/46* (2006.01)
(52) U.S. Cl. ....................................... 718/102
(58) Field of Classification Search .................. 718/100, 718/102
See application file for complete search history.

(56) References Cited

U.S. PATENT DOCUMENTS

| | | | | |
|---|---|---|---|---|
| 5,151,885 A | * | 9/1992 | Kasuo | 368/110 |
| 5,752,030 A | * | 5/1998 | Konno et al. | 718/102 |
| 6,199,194 B1 | * | 3/2001 | Wang et al. | 717/118 |
| 6,263,358 B1 | * | 7/2001 | Lee et al. | 718/100 |
| 6,286,046 B1 | * | 9/2001 | Bryant | 709/224 |
| 6,331,855 B1 | * | 12/2001 | Schauser | 345/502 |
| 2002/0174359 A1 | | 11/2002 | Haltmeyer | |
| 2004/0230970 A1 | | 11/2004 | Janzen | |
| 2005/0120237 A1 | | 6/2005 | Roux et al. | |
| 2005/0195695 A1 | | 9/2005 | Yanase et al. | |
| 2005/0289265 A1 | * | 12/2005 | Illowsky et al. | 710/104 |

FOREIGN PATENT DOCUMENTS

| | | |
|---|---|---|
| JP | 09244887 | 9/1997 |
| JP | 2000-311099 | 11/2000 |
| JP | 2003114603 | 4/2003 |
| JP | 2003316585 | 11/2003 |
| JP | 2004-086241 | 3/2004 |
| JP | 2004127280 | 4/2004 |
| JP | 2005157904 | 6/2005 |
| JP | 2005189611 | 7/2005 |
| WO | 0045238 | 8/2000 |

OTHER PUBLICATIONS

Notification of Reasons for Refusal, dated Aug. 30, 2010, issued by the Japanese Patent Office in corresponding Japanese Patent Application Nos. 2007-167118 and 2008-14796 along with an English language translation.

Haraikawa Tomohiro, "Reasonable Information Guarantee: A Practical Approach for Realization of Ubiquitous Services", proceedings of the 3rd Forum on Information Technology (FIT2004), vol. 3, Japan, issued Aug. 20, 2004, pp. 581-582.

* cited by examiner

*Primary Examiner* — Meng-Ai An
*Assistant Examiner* — Blake Kumabe
(74) *Attorney, Agent, or Firm* — Brundidge & Stanger, P.C.

(57) ABSTRACT

A remote machine uses a process control unit to monitor a process for a Web browser program. When the process for the Web browser program starts to operate, an operating time therefor starts to be measured. When the operating time reaches a predetermined time, the process for the Web browser program is forcefully terminated. After that, unless the remote machine 2 is rebooted, that is, unless a RAM is cleared, the process for the Web browser program is forcefully terminated immediately after its start.

14 Claims, 7 Drawing Sheets

INFORMATION PROCESSING DEVICE AND PROCESS CONTROL METHOD

BACKGROUND OF THE INVENTION

The present invention relates to a technique of controlling a process operating on an operating system (OS).

JP 2000-311099 A discloses a process monitoring system in which an arbitrary process whose name is designated is set as a monitoring target process to be monitored and linked processings are sorted when the monitoring target process is terminated abnormally to allow flexible settings of when to start/terminate the process. In the monitoring process system disclosed in JP 2000-311099 A, monitoring process means receives a notification from a process monitoring start part, reads a monitoring process definition file, and obtains a process name of a monitoring target process. The monitoring process means searches a process ID from a process management table of an operating system based on the process name, and set the process ID thus searched so as to detect abnormal termination of a monitoring target process group. Upon detection of the abnormal termination, The monitoring process means obtains an termination code, searches the monitoring process definition file with the process name and the termination code as a key, and searches the linked processings corresponding to the monitoring process definition file thus searched to execute. When the notification is received from the process monitoring termination part, The monitoring process means stops the process monitoring.

SUMMARY OF THE INVENTION

In recent years, much attention is focused on an information processing system of a so-called thin client type. The information processing system of the thin client type allows access to various application programs and data in a local machine located at home or office by remotely controling a desktop of the local machine with a remote machine at hand. At least a communication program which connects the remote machine to the local machine through a network, a remote desktop program which causes the remote machine to function as an input/output device for the local machine, and an OS which operates those programs thereon may be sotred in the remote machine. The various application programs and data need not be stored in the remote machine, whereby a fear of information leak due to theft of the remote machine or other reason can be reduced.

However, in the case of the information processing system of the thin client type where an external network service (for example, commercial wireless access point service) is used to connect the remote machine to the local machine, an authentication processing (login processing) is usually required for use of the service. The authentication processing may be performed by using a general-purpose Web browser program. Recent general-purpose Web browser programs often have multiple functions including a plugin function. Due to the multiple functions, there are also many virus programs taking advantage of the plugin function. Therefore, from the viewpoint of security, it is preferable that the Web browser program-related processes on the remote machine may be operated only at the time of authentication processing. JP2000-311099 A takes none of those points into account to describe the process monitoring technique.

The present invention has been made in view of the above-mentioned circumstances, and therefore has an object to limit a frequency of launches of a predetermined program.

In order to achieve the above object, according to the present invention, an operation of a predetermined process is monitored, and if the process starts to operate, an operating time therefor is measured. When the operating time becomes equal to or more than a predetermined time, the process is forcefully terminated. After that, unless a system is rebooted, the process is immediately forcefully terminated when the process is started.

For example, the present invention includes an information processing device which controls a process operating on an OS, including:
 a first monitoring target storage means which stores identification information of a first monitoring target process;
 process management means which manages the identification information of a process under operation;
 force termination means which forcefully terminates the process under operation;
 timer means which measures a time;
 start flag setting means which turns a timer start flag on/off; and
 termination flag setting means which turns a force termination flag on/off. In the information processing device,
 the start flag setting means changes the timer start flag into on if the timer start flag is off in a case where the processes under operation managed by the process management means include the first monitoring target process stored in the first monitoring target storage means,
 the timer means starts to measure the time when the timer start flag becomes on,
 the force termination means forcefully terminates the first monitoring target process stored in the first monitoring target storage means, which is managed by the process management means and is under operation, in one of a case where the time measured by the timer means exceeds a predetermined time and a case where the force termination flag is on, and
 the termination flag setting means changes the force termination flag into on if the force termination flag is off in a case where the first monitoring target process stored in the first monitoring target storage means is terminated.

According to the present invention, limitations can be imposed on the number of operations of the first monitoring target process (for example, process for a Web browser program). This makes it possible to improve security of the system.

DESCRIPTION OF THE PREFERRED EMBODIMENT

Hereinafter, description will be made of an embodiment of the present invention.

Figure 1:
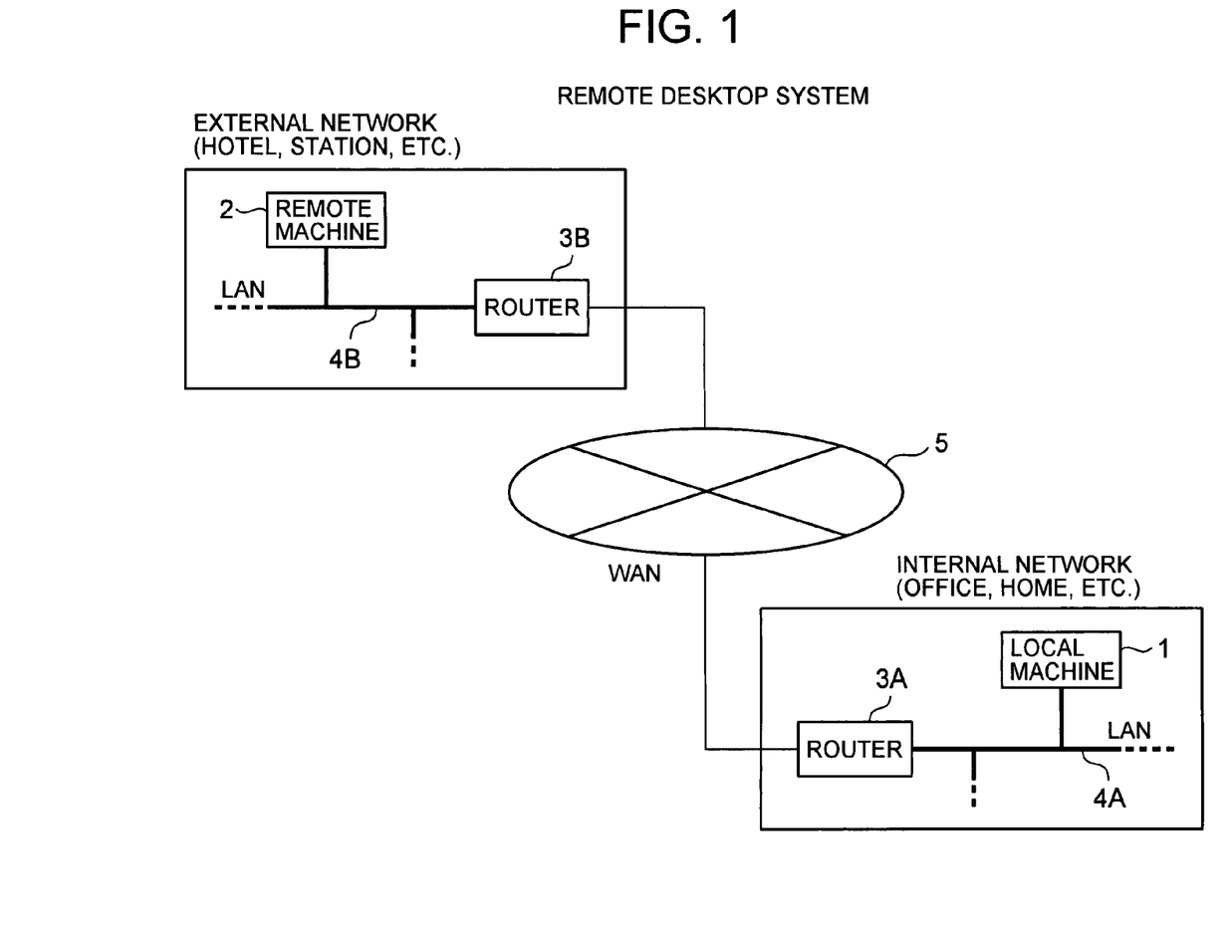
FIG. 1 shows an outline of a remote desktop system to which an embodiment of the present invention is applied.

FIG. 1 shows an outline of a remote desktop system (information processing system of a thin client type) to which the embodiment of the present invention is applied. As illustrated, the remote desktop system of this embodiment includes: a local machine 1 connected to a local area network (LAN) 4A serving as an internal network constructed in an office, home, or the like; and a remote machine 2 connected to a LAN 4B serving as an external network constructed at a remote site such as a hotel or a station. The LAN 4A is connected to a wide area network (WAN) 5 via a router 3A. The LAN 4B is connected to the WAN 5 via a router 3B.

Note that in this embodiment, the router 3B permits free communications between network terminals connected to the LAN 4B, while demands, for communications between the LAN 4B and the WAN 5, an authentication processing (login processing) using a general-purpose Web browser program from a network terminal connected to the LAN 4B, and allows the communications between the LAN 4B and the WAN 5 only when the network terminal passes the authentication processing. In addition, the router 3B performs the account process for the communications between the LAN 4B and the WAN Sand demands, for termination of the account processing, a notification processing (logout processing) using the general-purpose Web browser program from the network terminal connected to the LAN 4B. The local machine 1 constructs a virtual private network (VPN) with respect the remote machine 2. The local machine 1 receives and processes input information (content of operation of an input device) transmitted from the remote machine 2 and transmits image information indicating a processing result (a desktop screen of a display device) to the remote machine 2 through the VPN. The local machine 1 is a computer such as a personal computer (PC) and a server.

Figure 2:
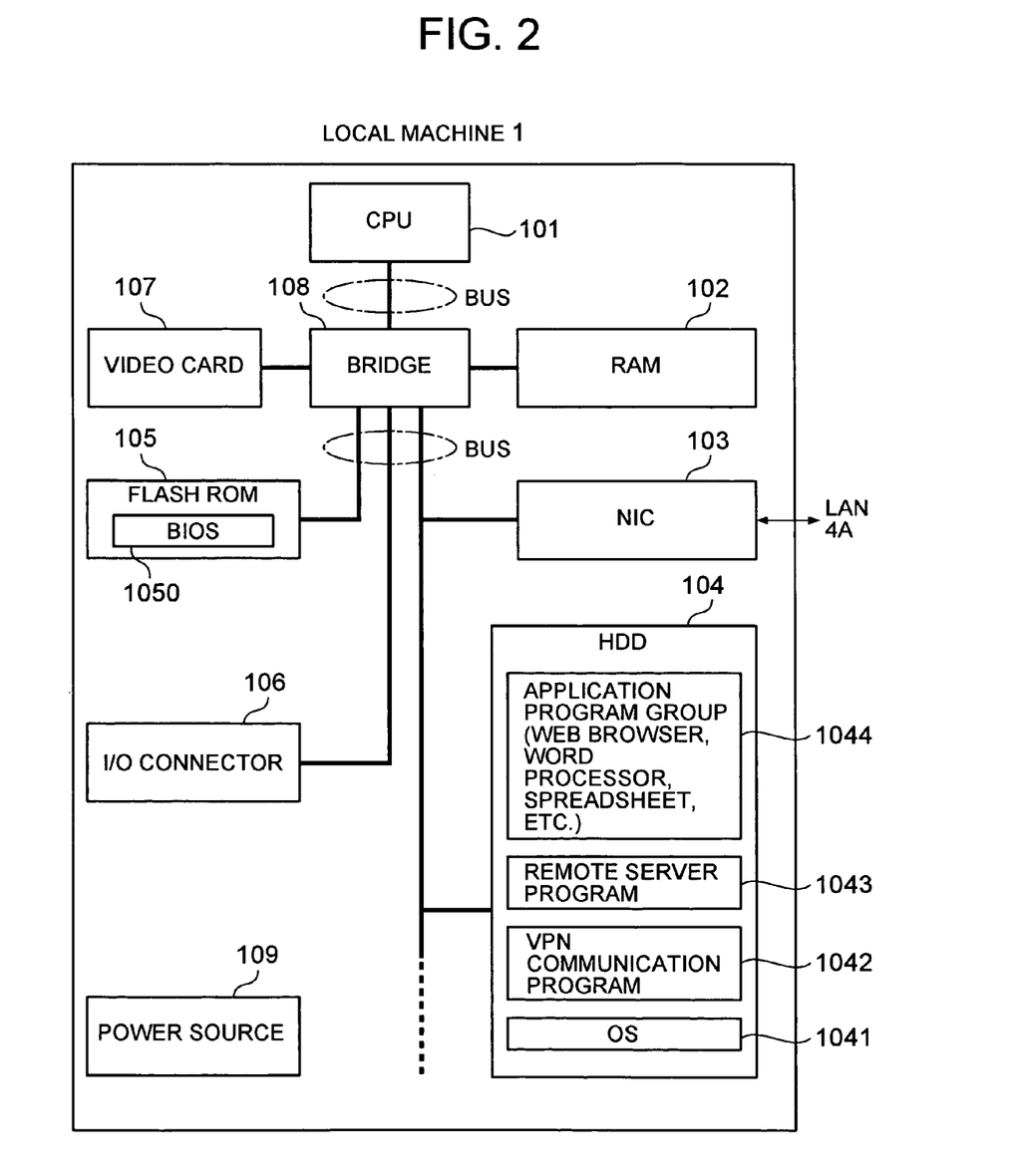
FIG. 2 shows an outline of a local machine 1.

FIG. 2 shows an outline of the local machine 1. As illustrated, the local machine 1 includes: a central processing unit (CPU) 101; a random access memory (RAM) 102 which functions as a work area for the CPU 101; a network interface card (NIC) 103 which connects to the LAN 4A; a hard disk drive (HDD) 104; a flash read only memory (ROM) 105; an input/output (I/O) connector 106 which connects to a keyboard and to a mouse; a video card 107 which connects to a display; a bridge 108 which relays buses BUS which connect those components 101 to 107 to one another; and a power source 109.

The flash ROM 105 stores a Basic input/output system (BIOS) 1050. After power-on of the power source 109, the CPU 101 first accesses the flash ROM 105 to execute the BIOS 1050, thereby recognizing a system configuration of the local machine 1.

The HDD 104 stores at least an operating system (OS) 1041, a VPN communication program 1042, a remote server program 1043, and a plurality of application programs 1044.

The OS 1041 is a program which allows the CPU 101 to integrally control the components 102 to 109 of the local machine 1 to execute each of the programs 1042 to 1044 as described below. The CPU 101 loads the OS 1041 from the HDD 104 on the RAM 102 to execute the OS 1041 in accordance with the BIOS 1050. As a result, the CPU 101 integrally controls the components 102 to 109 of the local machine 1.

The VPN communication program 1042 is a communication program which is used to construct the VPN with respect to the remote machine 2, for example, is a communication program using an Security Architecture for the internet protocol (IPsec). The CPU 101 loads the VPN communication program 1042 from the HDD 104 on the RAM 102 to execute the VPN communication program 1042 in accordance with the OS 1041. As a result, the CPU 101 constructs the VPN with respect to the remote machine 2 in accordance with a communication start request received from the remote machine 2 through the NIC 103 to perform communications with the remote machine 2 through the VPN.

The remote server program 1043 is a program which allows the desktop of the local machine 1 to be remotely controlled by the remote machine 2, for example, a server program of virtual network computing (VNC) developed by AT & T Laboratories Cambridge. The CPU 101 loads the remote server program 1043 from the HDD 104 on the RAM 102 to execute the remote server program 1043 in accordance with the OS 1041. As a result, the CPU 101 receives and processes input information (content of operation of a keyboard and a mouse) transmitted from the remote machine 2 through the VPN and transmits image information (a desktop screen of the display) indicating the processing result to the remote machine 2 through the VPN.

As the application programs 1044, there are a general-purpose Web browser program, a word processor program, a spreadsheet program, and the like. The CPU 101 responds to an instruction received from the keyboard and the mouse through the I/O connector 106 or an instruction received from the remote machine 2 through the remote server program 1043 to load the desired application program 1044 from the HDD 104 on the RAM 102, to execute the loaded application program in accordance with the OS 1041. Then, image information of a desktop screen, on which the result of execution is reflected, is output by the video card 107 to be transmitted to the remote machine 2 through the remote server program 1043.

Returning to FIG. 1, the description will be continued. The remote machine 2 constructs the VPN with respect to the server machine 1. The remote machine 2 transmits input information (content of operation of the input device) input to the remote machine 2 to the server machine 1 through the VPN and receives image information (the desktop screen of the display device) from the server machine 1 to display the image information on the display of the remote machine 2. The remote machine 2 is a so-called HDD-less PC and is configured so that a printer, an external drive, an external memory, and the like cannot be locally connected or cannot be connected through the network to the remote machine 2. Namely, the remote machine 2 is configured to be able to use only a printer, an external drive, an external memory, and the like which are locally connected or connected through the network to the local machine 1. This reduces a fear that information leaks due to theft of the remote machine 2 and the like.

Figure 3:
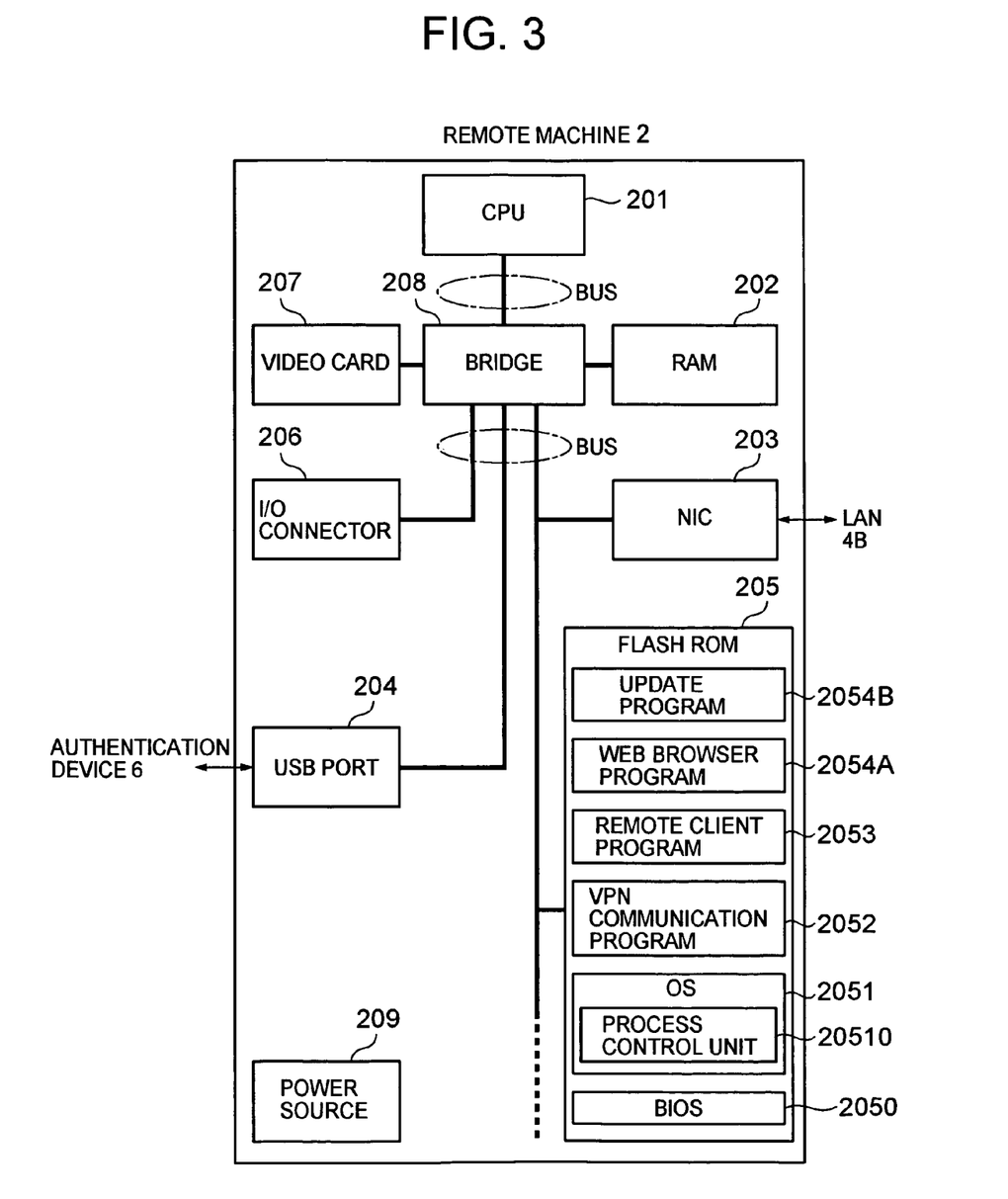
FIG. 3 shows an outline of a remote machine 2.

FIG. 3 shows an outline of the remote machine 2. As illustrated, the remote machine 2 includes: a CPU 201; a RAM 202 which functions as a work area for the CPU 201; an NIC 203 which is used to connect to the LAN 4B; a USB port 204 which is used to connect to the authentication device (USB device) 6; a flash ROM 205; an I/O connector 206 which is used to connect to a keyboard and to a mouse; a video card 207 which is used to connect to a display; a bridge 208 which relays buses BUS which connect those components 201 to 207 with one another; and a power source 209.

The flash ROM 205 stores at least: a BIOS 2050; an OS 2051; a VPN communication program 2052; a remote server program 2053; a Web browser program 2054A; and an update program 2054B.

After power-on of the power source 209, the CPU 201 first accesses the flash ROM 205 to execute the BIOS 2050, thereby recognizing a system configuration of the remote machine 2.

The OS 2051 is a program which allows the CPU 201 to integrally control the components 202 to 209 of the remote machine 2 to execute each of the programs 2052 to 2055 as described below. The CPU 201 loads the OS 2051 from the flash ROM 205 on the RAM 202 to execute the OS 2051 in accordance with the BIOS 2050. As a result, the CPU 201 integrally controls the components 202 to 209 of the remote machine 2. As the OS 2051 in the present invention, a relatively small-sized OS which can be stored in the flash ROM 205 such as an embedded OS is used. In addition, the OS 2051 includes a process control unit 20510 which controls a process operating. The process control unit 20510 is descried below.

The VPN communication program 2052 is a communication program which constructs the VPN with respect to the local machine 1, for example, is a communication program using an IPsec. The CPU 201 loads the VPN communication program 2052 from the flash ROM 205 on the RAM 202 to execute the VPN communication program 2052 in accordance with the OS 2051. As a result, the CPU 201 transmits a communication start request to the local machine 1 through the NIC 203 to construct the VPN with respect to the local machine 1 so as to perform communications with the local machine 1 through the VPN.

The remote client program 2053 is a program which allows the remote machine 2 to remotely access the desktop of the local machine 1, for example, a client (viewer) program of the VNC. The CPU 201 loads the remote client program 2053 from the flash ROM 205 on the RAM 202 to execute the remote client program 2053 in accordance with the OS 2041. As a result, the CPU 201 transmits input information of the I/O connector 206 (content of operation of the keyboard and the mouse) to the local machine 1 through the VPN and outputs image information (the desktop screen of the display) transmitted from the local server 1 through the VPN to a display (not shown) connected to the video card 207.

The remote client program 2053 causes the CPU 201 to perform the following authentication processing prior to the execution of the above-described processing. Specifically, the CPU 201 causes the display connected to the video card 207 to display an entry form of a password to accept the entry of the password by a user through the keyboard and the mouse connected to the I/O connector 206. Then, the remote client program 2053 transmits the accepted password to the authentication device 6 connected to the USB port 204 to request user authentication of the password. Then, only when the user is successfully authenticated, the above-described processing is executed.

Figure 4:
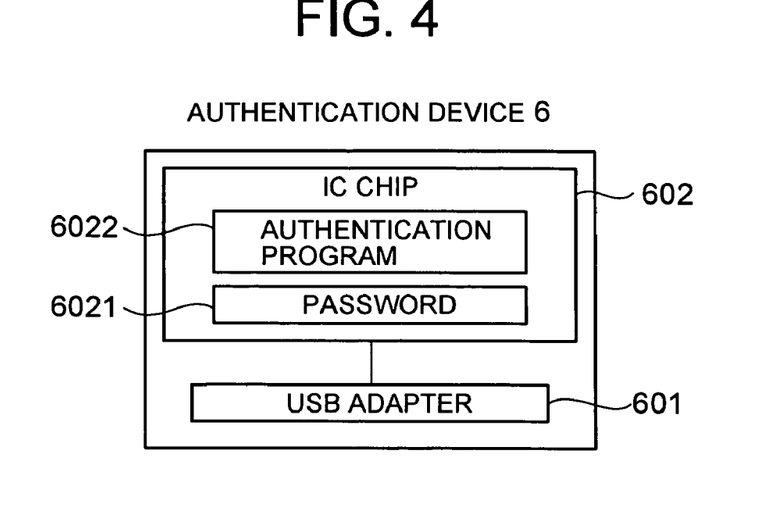
FIG. 4 shows an outline of an authentication device 4.

Herein, description will be made of the authentication device 6. The authentication device 6 performs authentication of the password received from a main body of the remote machine 2, and notifies the main body of the remote machine 2 of a verification result therefor. FIG. 4 shows an outline of the authentication device 6. As illustrated, the authentication device 6 includes: a USB adaptor 601 to be connected to the USB port 204 of the remote machine 2; and an IC chip 602. The IC chip 602 stores a user password 6021 and an authentication program 6022. The USB adapter 601 of the authentication device 6 is connected to the USB port 204 of the remote machine 2. As a result, when the power is supplied from the remote machine 2 to the authentication device 6, the IC chip 602 executes the authentication program 6022. According to the authentication program 6022, the password is received from the remote machine 2 and compared with the password 6021 stored in the IC chip 602. When the two passwords match, a message indicating successful authentication is outputted to the remote machine 2. When the two passwords do not match, a message indicating failed authentication is outputted to the remote machine 2. Note that this embodiment is described by taking as an example the case where the authentication device 6 is a USB device. However, the present invention is not limited to this embodiment, and the authentication device 6 may be, for example, an IC card or a device using short-distance wireless communications such as Bluetooth (registered trademark). Alternatively, the authentication device 6 may be configured to allow a flash memory to be externally attached thereto, and to have data within the IC chip 602 partially stored in the flash memory.

Returning to FIG. 3, the description will be continued. A general-purpose Web browser program, which is commercially available or distributed at no charge, is used as the Web browser program 2054A. Recent general-purpose Web browser programs often have multiple functions including a plugin function. Due to the multiple functions, there are also many virus programs taking advantage of the plugin function and the like. In this embodiment, the Web browser program 2054A is used for the authentication processing (login processing), which is performed on the router 3B in order to access the WAN 5 from the LAN 4B, and the notification processing (logout processing), which is performed on the router 3B in order to terminate the access to the WAN 5 from the LAN 4B and terminate the accounting process.

The update program 2054B accesses a server (not shown) via the NIC 203 to obtain update data for the OS 2051 or the like from the server to store the data in RAM 202, and reflects the data on the OS 2051 or the like stored in the flash ROM 2051.

Figure 5:
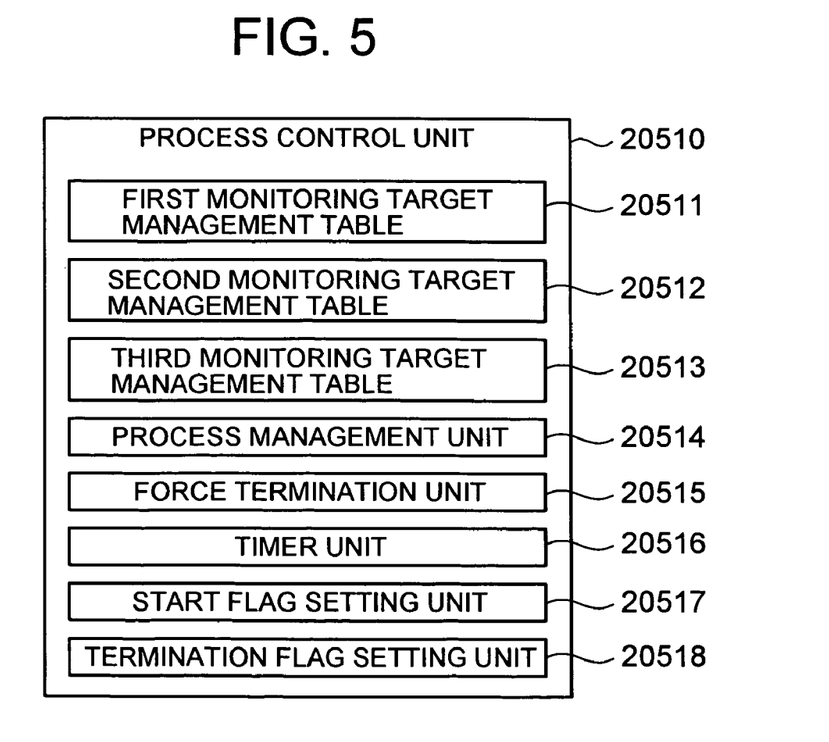
FIG. 5 schematically shows a process control unit 20510.

The process control unit 20510 controls a process operating on the OS 2051. FIG. 5 schematically shows the process control unit 20510. As illustrated, the process control unit 20510 includes: a first monitoring target management table 20511; a second monitoring target management table 20512; a third monitoring target management table 20513; a process management unit 20514; a force termination unit 20515, a timer unit 20516, a start flag setting unit 20517, and an termination flag setting unit 20518.

Registered in the first monitoring target management table 20511 are a process ID and module name of a process which is a target of force termination (force termination target process). Recent general-purpose Web browser programs often have multiple functions including a plugin function. Due to the multiple functions, there are also many virus programs taking advantage of the plugin function and the like. Therefore, in this embodiment, the Web browser program 2054A is set as a program for the force termination target process.

Registered in the second monitoring target management table 20512 are a process ID and module name of a process which is inhibited from being executed after execution of the force termination target process. As described above, in this embodiment, the Web browser program 2054A is set as the program for the force termination target process. The Web browser program 2054A often has multiple functions including a plugin function. If the plugin function is executed, a, plugin module remains on the RAM 202 even after the termination of the Web browser program 2054A. If the update program 2054B is executed in this state, the plugin module remaining on the RAM 202 is possibly written on the flash ROM 205, which leads to a fear that an adverse influence may be imposed on the operation of the remote machine 2. Therefore, in this embodiment, the update program 2054B is set as a program for the process which is inhibited from being executed after execution of the force termination target process.

Registered in the third monitoring target management table 20513 are a process ID and module name of a process which releases an operation inhibition of the force termination target process. As described above, in this embodiment, the Web browser program 2054A is set as the program for the force termination target process. The Web browser program 2054A is used for the authentication processing (login processing) performed on the router 3B and the notification processing (logout processing) performed on the router 3B. Herein, the notification processing performed on the router 3B occurs in a case where the access form the remote machine 2 to the local machine 1 is terminated with the result that the use of WAN 5 is no longer necessary, that is, in a case where the remote client program 2053 is terminated. Therefore, in this embodiment, the remote client program 2053 is set as a program for the process which releases the operation inhibition of the force termination target process.

The process management unit 20514 monitors a process under operation on the OS 2051. To be specific, when a new process is started, the process ID and module name which form identification information of the process are registered in a process management table (not shown) included in the process management unit 20514. When any one of the processes under operation is terminated, the process ID and module name of the process are deleted from the process management table.

The start flag setting unit 20517 includes a timer start flag which is used to instruct to start to measure an elapsed time, and sets the timer start flag to on/off.

The termination flag setting unit 20518 includes a force termination flag which is used to instruct to forcefully terminate a force termination target program, and sets the force termination flag to on/off.

The timer unit 20516 monitors the timer start flag included in the start flag setting unit 20517, and when the timer start flag shifts from off to on, starts to measure an elapsed time. When the timer start flag shifts from on to off, the measurement of the elapsed time is ended to reset a measurement value to "0".

Based on the on/off of the timer start flag included in the start flag setting unit 20517 and on/off of the force termination flag included in the termination flag setting unit 20518, the force termination unit 20515 controls execution of a process (process for the Web browser program 2054A) having the process ID and module name which are registered in the first monitoring target management table 20511 and a process (process for the update program 2054B) having the process ID and module name which are registered in the second monitoring target management table 20512.

Figure 6:
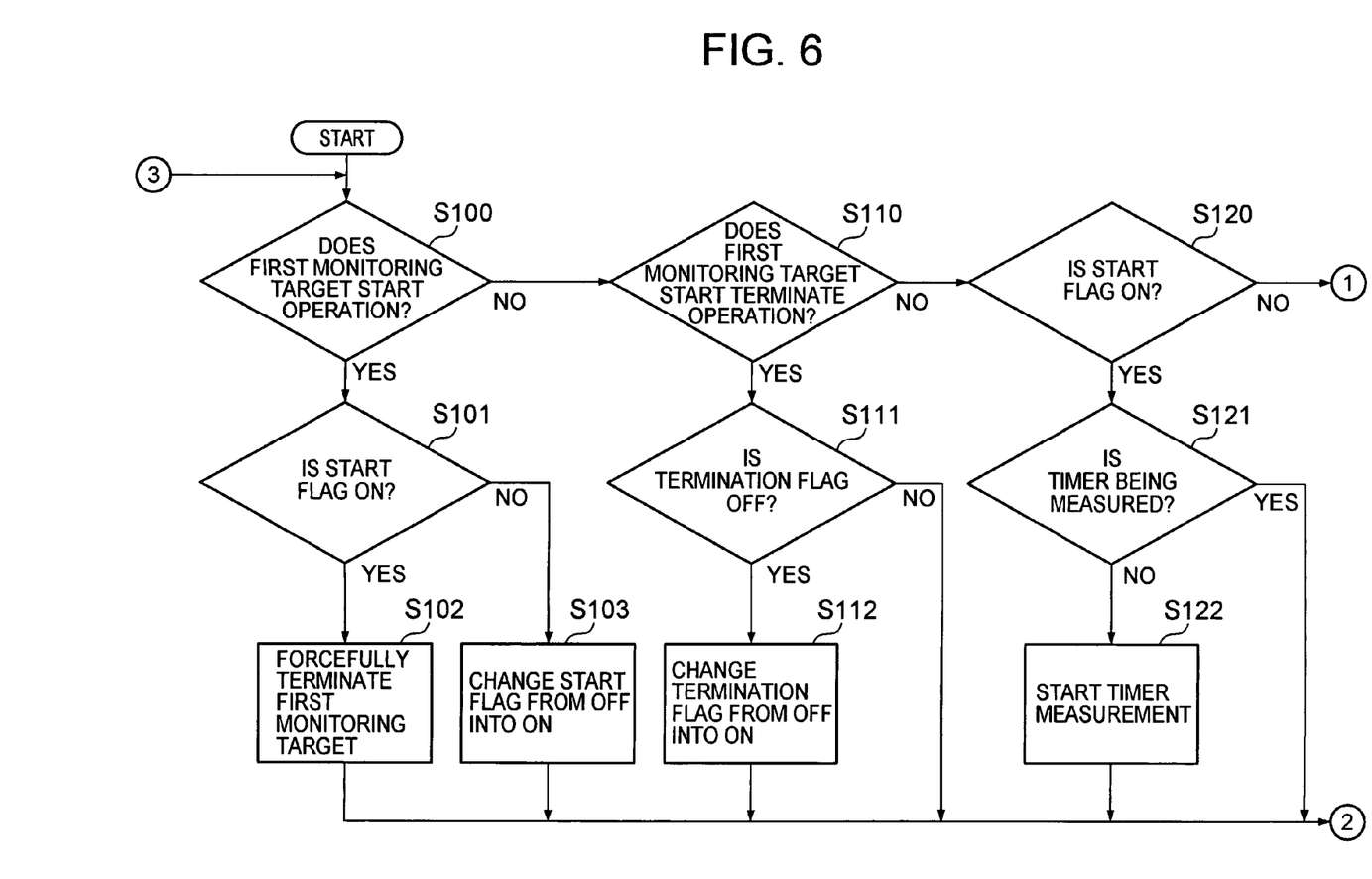
FIG. 6 is an explanatory diagram for an operation of the process control unit 20510.
Figure 7:
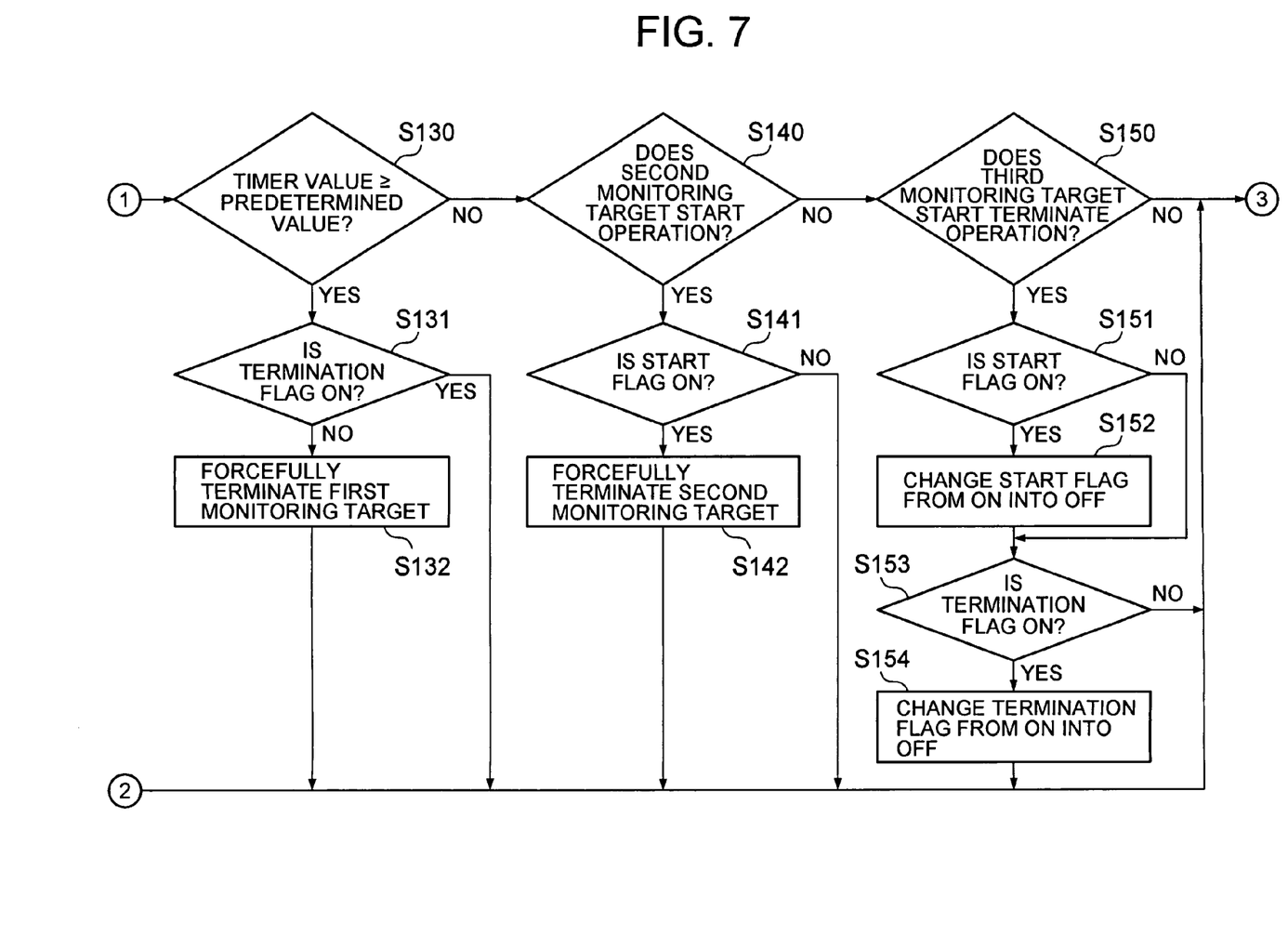
FIG. 7 is an explanatory diagram for the operation of the process control unit 20510.

FIGS. 6 and 7 are flowcharts for explaining a processing of the CPU 201 performed by the process control unit 20510. Note that flows shown therein are actually executed by the CPU 201 according to the process control unit (programs) 20510. However, for the simplicity of description, the flows will be described hereinbelow with the respective programs forming the process control unit 20510 serving as execution subjects.

Upon detection that the process ID and module name of the process (first monitoring target) for the Web browser program 2054A are registered in the process management table included in the process management unit 20514 (YES in Step S100), the start flag setting unit 20517 checks whether or not the timer start flag is on (Step S101). If the timer start flag is off (NO in Step S101), the start flag setting unit 20517 changes the timer start flag into on (Step S103), and the procedure returns to Step S100. If the timer start flag is on (YES in Step S101), the start flag setting unit 20517 notifies the force termination unit 20515, the detected process ID and module name of the process for the Web browser program 2054A. In response thereto, the force termination unit 20515 forcefully terminates the process for the Web browser program 2054A having the process ID and module name, and outputs a message such as "Usage frequency has exceeded upper limit." on a display connected to the video card 207 (Step S102).

Upon detection that the process ID and module name of the process for the Web browser program 2054A are deleted from the process management table included in the process management unit 20514 (YES in Step S110), the termination flag setting unit 20518 checks whether or not the force termination flag is off (Step S111). If the force termination flag is off (YES in Step S111), the termination flag setting unit 20518 changes the force termination flag into on (Step S112), and the procedure returns to Step S100. If the force termination flag is on (NO in Step S111), the procedure returns to Step S100 without a change in the force termination flag.

The timer unit 20516 checks whether or not the timer start flag is on (Step S120). If the timer start flag is on (YES in Step S120) and if the elapsed time is being measured (YES in Step S121), the procedure returns to Step S100. If the elapsed time is not being measured (NO in Step S121), The timer unit 20516 starts the measurement of the elapsed time (Step S122), and then the procedure returns to Step S100.

The force termination unit 20515 judges whether or not the measurement value of the timer unit 20516 is equal to or larger than a predetermined value (at least time required for the login and logout processings performed on the router 3B through the Web browser program 2054A) (Step S130). If the measurement value is equal to or larger than the predetermined value (YES in Step S130) and if the force termination flag is off (NO in Step S131), the force termination unit 20515 forcefully terminates the process for the Web browser program 2054A, and outputs a message such as "Usage time has elapsed" on the display connected to the video card 207 (Step S132). Then, the procedure returns to Step S100. If the force termination flag is on (YES in Step S131), the process for the Web browser program 2054A has already been terminated, so the procedure returns to Step S100 immediately.

Further, upon detection that the process ID and module name of the process (second monitoring target) for the update program 2054B are registered in the process management table included in the process management unit 20514 (YES in Step S140), the force termination unit 20515 checks whether or not the timer start flag is on (Step S141). If the timer start flag is on (YES in Step S141), the force termination unit 20515 forcefully terminates the process for the update program 2054B having the process ID and module name, and outputs a message such as "Access is inhibited while Web browser is active." on the display connected to the video card 207 (Step S142).

Further, upon detection that the process ID and module name of the process (third monitoring target) for the remote client program 2053 are deleted from the process management table included in the process management unit 20514 (YES in Step S150), if the timer start flag is on (YES in Step S151), the start flag setting unit 20517 changes the timer start flag into off (Step S152). Similarly, upon detection that the process ID and module name of the process for the remote client program 2053 are deleted from the process management table (YES in Step S150), if the force termination flag is on (YES in Step S153), the termination flag setting unit 20518 changes the force termination flag into off (Step S154).

Note that the timer start flag, the force termination flag, and the measurement value of the elapsed time are returned to their default value (the flags to off and the elapsed time to "0") when the RAM 202 is cleared due to reboot of the remote machine 2 or the like.

Next, description will be made of an outline of an operation of the remote desktop system having the above-mentioned configuration.

Figure 8:
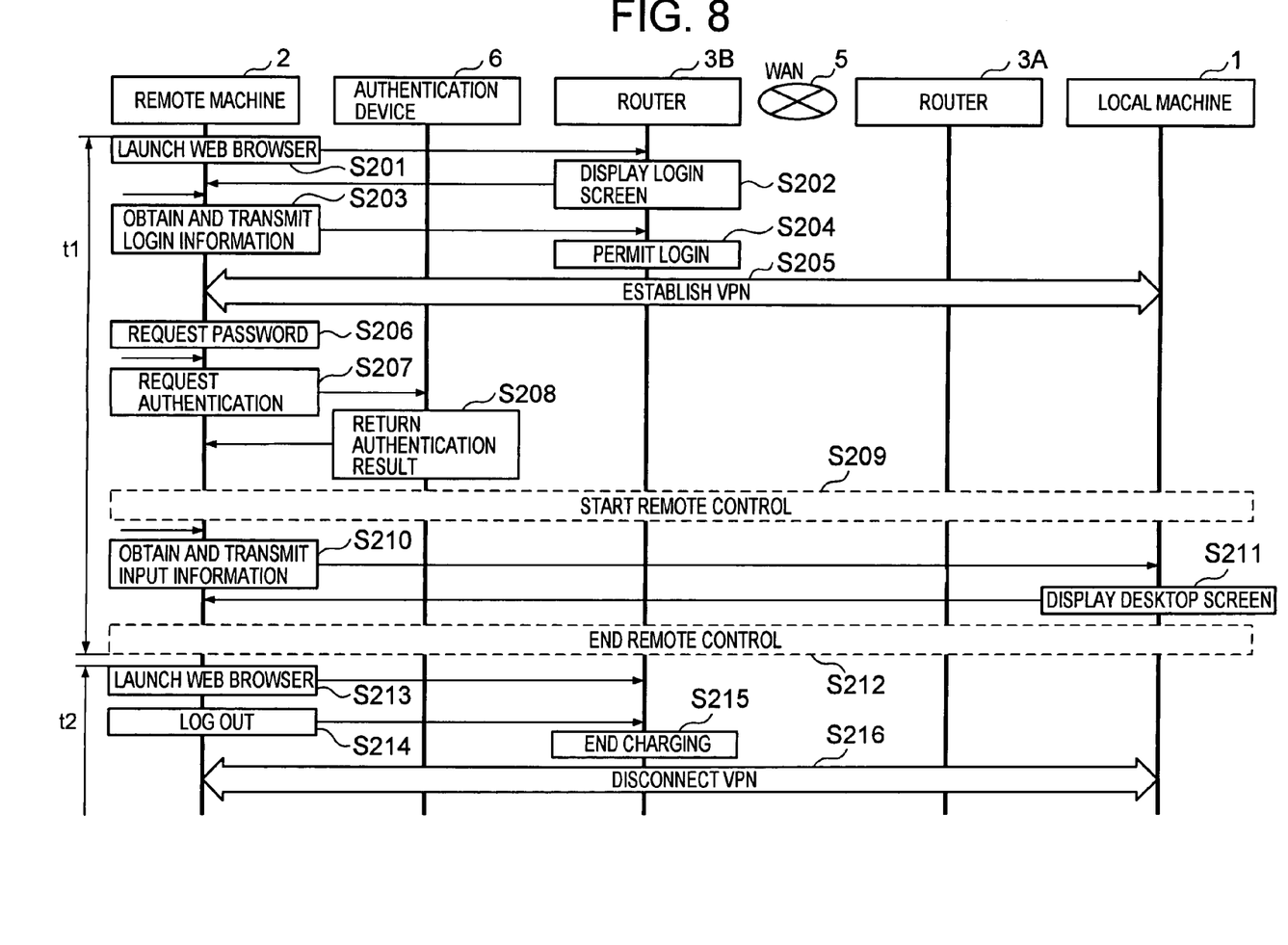
FIG. 8 is an explanatory diagram for an outline of an operation of the remote desktop system.

FIG. 8 is an explanatory diagram for the outline of the operation of the remote desktop system.

On the remote machine 2, the Web browser program 2054A is launched according to a user's instruction (Step S201). When the Web browser program 2054A attempts to access the WAN 5, the router 3B detects the attempt, and displays a login screen on the remote machine 2 (Step S202) to prompt an input of login information.

When the user inputs the login information through the login screen of the remote machine 2 (Step S203), the router 3B verifies the login information. If the login information is correct, the router 3B permits the remote machine 2 to access the WAN 5 (Step S204).

After that, the VPN communication program 2052 of the remote machine 2 cooperates with the VPN communication program 1042 of the local machine 1 to establish a VPN between the remote machine 2 and the local machine 1 (Step S205).

Subsequently, the remote client program 2053 of the remote machine 2 requests a password to the user (Step S206), and transmits an authentication request containing the password inputted by the user to the authentication device 6 connected to the remote machine 2 (Step S207). In response thereto, the authentication device 6 performs authentication of the password, and returns authentication results to the remote machine 2 (Step S208).

If the authentication results received from the authentication device 6 indicate that the authentication is successful, the remote client program 2053 of the remote machine 2 uses the VPN established in Step S205 to allow the remote machine 2 to start remote control on the desktop of the local machine 1 (Step S209). Accordingly, the user's input information inputted to the input device of the remote machine 2 is transmitted to the local machine 1 (Step S210), and the local machine 1 transmits, to the remote machine 2, image information on a desktop screen of the local machine 1 on which the user's input information has been reflected (Step S211).

The remote machine 2 ends the remote control on the local machine 1 according to a instruction of the user (Step S212). Then, according to a instruction of the user, the remote machine 2 launches the Web browser program 2054A (Step S213), and performs the logout processing on the router 3B (Step S214). Accordingly, the router 3B terminates the accout processing (Step S215).

After that, the VPN communication program 2052 of the remote machine 2 cooperates with the VPN communication program 1042 of the local machine 1 to disconnect the VPN between the remote machine 2 and the local machine 1 (Step S216).

Note that during a time t1 since the launch of the Web browser program 2054A performed in Step S201 until the end of the remote control performed in Step S212, at least one of the timer start flag and the force termination flag is on, so the Web browser program 2054A and the update program 2054B are forcefully terminated immediately after their launch. When the remote control is ended, the timer start flag and the force termination flag both become off, which releases the operation inhibition for the Web browser program 2054A and the update program 2054B. Therefore, the logout processing using the Web browser program 2054A becomes possible. If the Web browser program 2054A is launched again, during a time t2 that comes after the time T1, at least one of the timer start flag and the force termination flag is on at all times, so the Web browser program 2054A and the update program 2054B are forcefully terminated immediately after their launch. To clear this state, for example, the remote machine 2 is rebooted to clear the RAM 202 and return the flags to a default status (off).

The description has been made above according to the embodiment of the present invention.

According to this embodiment, in the remote machine 2, a frequency of launches of the Web browser program 2054A, which is the first monitoring target process, is limited to a single time each of before and after the termination of the remote client program 2053. In other words, the Web browser program 2054A can be permitted to operate only twice for the authentication processing (login processing) performed on the router 3B in order to access the WAN 5 to connect the remote machine 2 to the local machine 1, and for the notification processing (logout processing) performed on the router 3B in order to end the charging by disconnecting the remote machine 2 from the local machine 1 to end the access to the WAN 5.

As described above, recent general-purpose Web browser programs including the Web browser program 2054A often have multiple functions including a plugin function. Due to the multiple functions, there are also many virus programs taking advantage of the plugin function and the like. In this embodiment, the frequency of launches of such the Web browser program 2054A can be limited to minimum necessary times, which can lead to improved security.

In addition, if the plugin function of the Web browser program 2054A is executed, a plugin module remains on the RAM 202 even after the termination of the Web browser program 2054A. If the update program 2054B is executed in this state, the plugin module remaining on the RAM 202 is possibly written on the flash ROM 205, which leads to a fear that an adverse influence may be imposed on the operation of the remote machine 2. Therefore, in this embodiment, the update program 2054B is inhibited from being executed after execution of the Web browser program 2054A. With this configuration, the stability of the remote machine 2 can be further improved.

The embodiment of the present invention is not limited to the above-described embodiment, and therefore, various variations are possible within the scope of the present invention.

For example, the above embodiment has been described by taking the process for the Web browser program 2054A as an example of the force termination target process, but the present invention is not limited thereto. Any program may be employed as long as a process for the program (such as a program having a plugin function) prone to virus infection or illegal access is set as the force termination target process.

Further, the above embodiment has been described by taking the process for the update program 2054B as an example of the process which is inhibited from being executed after execution of the force termination target process, but the present invention is not limited thereto. A process for a program (such as a copy program) likely to expand influences of the virus infection or the illegal access may be set as the process which is inhibited from being executed after the execution of the force termination target process.

Further, the above-mentioned embodiment has been described by taking the process for the remote client program 2053 as an example of the process which clears the operation inhibition of the force termination target process, but the present invention is not limited thereto. Any program may be employed as long as the process is for a program which can detect that the force termination target process set as a target of the operation inhibition becomes necessary to operate again. For example, in accordance with this embodiment, instead of the remote client program 2053, the process for the VPN communication program 2052 may set as the process which clears the operation inhibition of the force termination target process.

Furthermore, although the case where the VPN is constructed between the local machine 1 and the remote machine 2 to perform communication has been described in the above-described embodiment, the present invention is not limited thereto. The local machine 1 and the remote machine 2 can perform communication without constructing the VPN.

Further, the above-mentioned embodiment has been described by taking as an example the case where the present invention is applied to the remote machine 2 of the remote desktop system serving as the information processing system of the thin client type. However, the present invention may also be applied to various information processing devices including a general PC.

What is claimed is:

1. An information processing device which controls a process operating on an operating system, comprising:
    a first monitoring target storage means for storing identification information of a first monitoring target process;
    a second monitoring target storage means for storing identification information of a second monitoring target process;
    process management means for managing the identification information of the process operating on the operating system;
    force termination means for forcefully terminating the process operating on the operating system;
    timer means for measuring a time;
    start flag setting means for turning a timer start flag on/off; and
    termination flag setting means for turning a force termination flag on/off,
    wherein the start flag setting means changes the timer start flag to on if the timer start flag is off when the processes operating on the operating system managed by the process management means include the first monitoring target process stored in the first monitoring target storage means,
    wherein the timer means starts to measure the time when the timer start flag is changed to on,
    wherein the force termination means forcefully terminates the first monitoring target process stored in the first monitoring target storage means, which is managed by the process management means and is operating on the operating system, either when the time measured by the timer means exceeds a predetermined time or when the force termination flag is on,
    wherein the force termination means forcefully terminates the first monitoring target process when the timer start flag is already on, and when the first monitoring target process, which is managed by the process management means and is operating on the operating system, is detected to be stored in the first monitoring target storage means,
    wherein the termination flag setting means changes the force termination flag to on if the force termination flag is off when the first monitoring target process stored in the first monitoring target storage means is terminated,
    wherein the start flag setting means changes the timer start flag to off, if the timer start flag is on when the second monitoring target process stored in the second monitoring target storage means is terminated,
    wherein the termination flag setting means changes the force termination flag to off, if the force termination flag is on when the second monitoring target process stored in the second monitoring target storage means is terminated, and
    wherein a message is output to a display when the process operating on the operating system has been forcefully terminated.

2. The information processing device according to claim 1, further comprising a first message outputting means which outputs a message when the first monitoring target process stored in the first monitoring target storage means is forcefully terminated by the force termination means.

3. The information processing device according to claim 2, wherein the first monitoring target process is a process for a Web browser program.

4. The information processing device according to claim 2, further comprising:
    a third monitoring target storage means which stores identification information of a third monitoring target process,
    wherein the start flag setting means forcefully terminates the third monitoring target process if at least one of the timer start flag and the force termination flag is on when the processes operating on the operating system and managed by the process management means include the third monitoring target process stored in the third monitoring target storage means.

5. The information processing device according to claim 1, wherein the first monitoring target process is a process for a Web browser program.

6. The information processing device according to claim 5, further comprising:
    a third monitoring target storage means which stores identification information of a third monitoring target process,
    wherein the start flag setting means forcefully terminates the third monitoring target process if at least one of the timer start flag and the force termination flag is on when the processes operating on the operating system and managed by the process management means include the third monitoring target process stored in the third monitoring target storage means.

7. The information processing device according to claim 1, further comprising:
    a third monitoring target storage means which stores identification information of a third monitoring target process,
    wherein the start flag setting means forcefully terminates the third monitoring target process if at least one of the timer start flag and the force termination flag is on when the processes operating on the operating system and managed by the process management means include the third monitoring target process stored in the third monitoring target storage means.

8. The information processing device according to claim 7, further comprising:
    a second message outputting means which outputs a message when the third monitoring target process stored in the third monitoring target storage means is forcefully terminated by the force termination means.

9. The information processing device according to claim 8, wherein the third monitoring target process is a process for an update program which writes contents of a random access memory (RAM) to a flash read only memory (ROM).

10. The information processing device according to claim 7, wherein the third monitoring target process is a process for an update program which writes contents of a random access memory (RAM) to a flash read only memory (ROM).

11. The information processing device according to claim 1, wherein the third monitoring target process is a process for a client program stored in a remote machine, which is connected to the information processing device via a network.

12. A computer program product comprising:
a computer program; and
a computer-readable storage medium having the computer program tangibly embodied thereon,
wherein the computer program causes a processor to execute steps of:
storing, by a first monitoring target storage means, identification information of a first monitoring target process;
storing, by a second monitoring target storage means, identification information of a second monitoring target process;
managing, by a process management means, the identification information of a process operating on an operating system;
forcefully terminating, by force termination means, the process operating on the operating system;
measuring, by a timer means, a time;
turning, by a start flag setting means, a timer start flag on/off; and
turning, by a termination flag setting means, a force termination flag on/off,
wherein the start flag setting means changes the timer start flag to on if the timer start flag is off when the processes operating on the operating system and managed by the process management means include the first monitoring target process stored in the first monitoring target storage means,
wherein the timer means starts to measure the time when the timer start flag is changed to on,
wherein the force termination means forcefully terminates the first monitoring target process stored in the first monitoring target storage means, which is managed by the process management means and is operating on the operating system, either when the time measured by the timer means exceeds a predetermined time or when the force termination flag is on,
wherein the force termination means forcefully terminates the first monitoring target process when the timer start flag is already on, and when the first monitoring target process, which is managed by the process management means and is operating on the operating system, is detected to be stored in the first monitoring target storage means,
wherein the termination flag setting means changes the force termination flag to on if the force termination flag is off when the first monitoring target process stored in the first monitoring target storage means is terminated,
wherein the start flag setting means changes the timer start flag to off, if the timer start flag is on when the second monitoring target process stored in the second monitoring target storage means is terminated,
wherein the termination flag setting means changes the force termination flag to off, if the force termination flag is on when the second monitoring target process stored in the second monitoring target storage means is terminated, and
wherein a message is output to a display when the process operating on the operating system has been forcefully terminated.

13. A process control method which allows a computer to control a process operating on an operating system comprising:
storing identification information of a first monitoring target process;
storing identification information of a second monitoring target process;
changing a timer start flag to on if the timer start flag is off when processes operating on the operating system include the first monitoring target process;
starting to measure a time when the timer start flag becomes on;
forcefully terminating the first monitoring target process operating on the operating system, either when a measurement time exceeds a predetermined time or when a force termination flag is on;
forcefully terminating the first monitoring target process when the timer start flag is already on, and when the first monitoring target process is operating on the operating system; and
changing the force termination flag into on if the force termination flag is off when the first monitoring target process is terminated,
wherein the start flag setting means changes the timer start flag to off, if the timer start flag is on when the second monitoring target process is terminated,
wherein the termination flag setting means changes the force termination flag to off, if the force termination flag is on when the second monitoring target process is terminated, and
wherein a message is output to a display when the process operating on the operating system has been forcefully terminated.

14. A method for controlling a process operating on an operating system in an information processing device, the method comprising:
storing, by a first monitoring target storage means, identification information of a first monitoring target process;
storing, by a second monitoring target storage means, identification information of a second monitoring target process;
managing, by a process management means, the identification information of the process operating on the operating system;
forcefully terminating, by a force termination means, the process operating on the operating system;
measuring, by a timer means, a time;
turning, by a start flag setting means, a timer start flag on/off; and
turning, by a termination flag setting means, a force termination flag on/off,
wherein the start flag setting means changes the timer start flag to on if the timer start flag is off when the processes operating on the operating system managed by the process management means include the first monitoring target process stored in the first monitoring target storage means,
wherein the timer means starts to measure the time when the timer start flag is changed to on,
wherein the force termination means forcefully terminates the first monitoring target process stored in the first monitoring target storage means, which is managed by the process management means and is operating on the operating system, either when the time measured by the timer means exceeds a predetermined time or when the force termination flag is on, wherein the force termination means forcefully terminates the first monitoring target process also when the timer start flag is already on when the first monitoring target process which is managed by the process management means and is operating on the operating system, is detected to be stored in the first monitoring target storage means, wherein the termination flag setting means changes the force termination flag to on if the force termination flag is off when the first monitoring target process stored in the first monitoring target storage means is terminated, wherein the start flag setting means changes the timer start flag to off, if the timer start flag is on when the second monitoring target process stored in the second monitoring target storage means is terminated, wherein the termination flag setting means changes the force termination flag to off, if the force termination flag is on when the second monitoring target process stored in the second monitoring target storage means is terminated, and wherein a message is output to a display when the process operating on the operating system has been forcefully terminated.

* * * * *